(12) United States Patent
Dillon et al.

(10) Patent No.: US 8,992,013 B2
(45) Date of Patent: *Mar. 31, 2015

(54) METHOD OF DESIGNING PROGRESSIVE ADDITION LENSES

(75) Inventors: Keith Dillon, La Jolla, CA (US); Jeffrey S. Chomyn, West Chester, PA (US); Kris Kusumoto, Vista, CA (US); Laurence Warden, Poway, CA (US); Jagdish M. Jethmalani, San Diego, CA (US); Andreas W. Dreher, Escondido, CA (US)

(73) Assignee: Essilor International (Compagnie Generale d'Optique), Charenton le Pont (FR)

(*) Notice: Subject to any disclaimer, the term of this patent is extended or adjusted under 35 U.S.C. 154(b) by 1125 days.

This patent is subject to a terminal disclaimer.

(21) Appl. No.: 12/990,468

(22) PCT Filed: Apr. 30, 2009

(86) PCT No.: PCT/US2009/042399

§ 371 (c)(1),
(2), (4) Date: Mar. 17, 2011

(87) PCT Pub. No.: WO2009/135058

PCT Pub. Date: Nov. 5, 2009

(65) Prior Publication Data

US 2011/0157547 A1 Jun. 30, 2011

Related U.S. Application Data

(60) Provisional application No. 61/125,926, filed on Apr. 30, 2008.

(51) Int. Cl.
*G02C 7/02* (2006.01)
*G02C 7/06* (2006.01)

(52) U.S. Cl.
CPC ............. *G02C 7/068* (2013.01); *G02C 7/027* (2013.01); *G02C 7/061* (2013.01); *G02C 2202/22* (2013.01)
USPC ................................ 351/159.74; 351/159.73

(58) Field of Classification Search
USPC ........................................ 351/159.73–159.76
See application file for complete search history.

(56) References Cited

U.S. PATENT DOCUMENTS

| 6,390,623 B1 | 5/2002 | Kokonaski |
| 6,511,180 B2 | 1/2003 | Guirao |

(Continued)

FOREIGN PATENT DOCUMENTS

EP    1950601    7/2008

OTHER PUBLICATIONS

International Search Report dated Dec. 21, 2009 for the corresponding PCT application No. PCT/US2009/042399.

(Continued)

*Primary Examiner* — James Greece
(74) *Attorney, Agent, or Firm* — Cozen O'Connor

(57) ABSTRACT

Embodiments of the invention pertain to a method for producing a spectacle lens with optimal correction across the entire lens taking into account the patient's complete measured wavefront. Specific embodiments can also take into account one or more additional factors such as vertex distance, segmental fitting height, pantoscopic tilt, and use conditions. The lens wavefront can be achieved by optimizing a corrected wavefront, where the corrected wavefront is the combined effect of the patient's measured wavefront and the lens wavefront. The optimization of the corrected wavefront can involve representing the measured wavefront and the lens wavefront on a grid. In an embodiment, the grid can lie in a plane. During the optimization, a subset of the grid can be used for the representation of the measured wavefront at a point on the grid so as to take into account the portions of the measured wavefront that contribute to the corrected wavefront at that point on the grid.

21 Claims, 17 Drawing Sheets

Lens Profile Development Processing Steps

(56) References Cited

U.S. PATENT DOCUMENTS

| | | |
|---|---|---|
| 6,786,602 B2 | 9/2004 | Abitbol |
| 6,786,603 B2 | 9/2004 | Altmann |
| 7,331,674 B2 | 2/2008 | Dai |
| 7,377,641 B2 | 5/2008 | Piers |
| 2003/0231282 A1 | 12/2003 | Saux |
| 2004/0051846 A1* | 3/2004 | Blum et al. .................. 351/168 |
| 2005/0024585 A1 | 2/2005 | Dai |
| 2005/0057723 A1 | 3/2005 | Wakil |
| 2005/0105043 A1 | 5/2005 | Dreher |
| 2005/0195364 A1 | 9/2005 | Dai |
| 2005/0231683 A1 | 10/2005 | Ben-Zeev |
| 2006/0023163 A1 | 2/2006 | Foster |
| 2006/0139570 A1 | 6/2006 | Blum |
| 2006/0189966 A1 | 8/2006 | Liebermann |
| 2006/0203198 A1 | 9/2006 | Liang |
| 2007/0103640 A1 | 5/2007 | Chauveau |
| 2007/0242220 A1 | 10/2007 | Guilloux |
| 2010/0296055 A1* | 11/2010 | Esser et al. .................. 351/204 |

OTHER PUBLICATIONS

Essilor Int'l, comp. Opthalmic Optics Files: Progressive Lenses; Paris: Varilux University, 2006.

Bara, S., et al., "Wide-Field Compensation of Monochromatic Eye Abberations: Expected Performance and Design Trade-Offs", Optical Society of America, Jan. 2003, pp. 1-10, vol. 20, No. 1.

Soloway, B., "Wavefront measurement methods discussed: Zernike polynomial's role as optimal methodology for describing wavefront error recently challenged. (Zernike versus Fourier)", Ophthalmology Times, Sep. 15, 2004, pp. 58-59, vol. 29, Issue 18.

Royce, "A Better Method of Measuring Optical performance: Move over P-V and make way for Strehl", Precision Optical Performance, downloaded from rfroyce.com on Jan. 23, 2008.

* cited by examiner

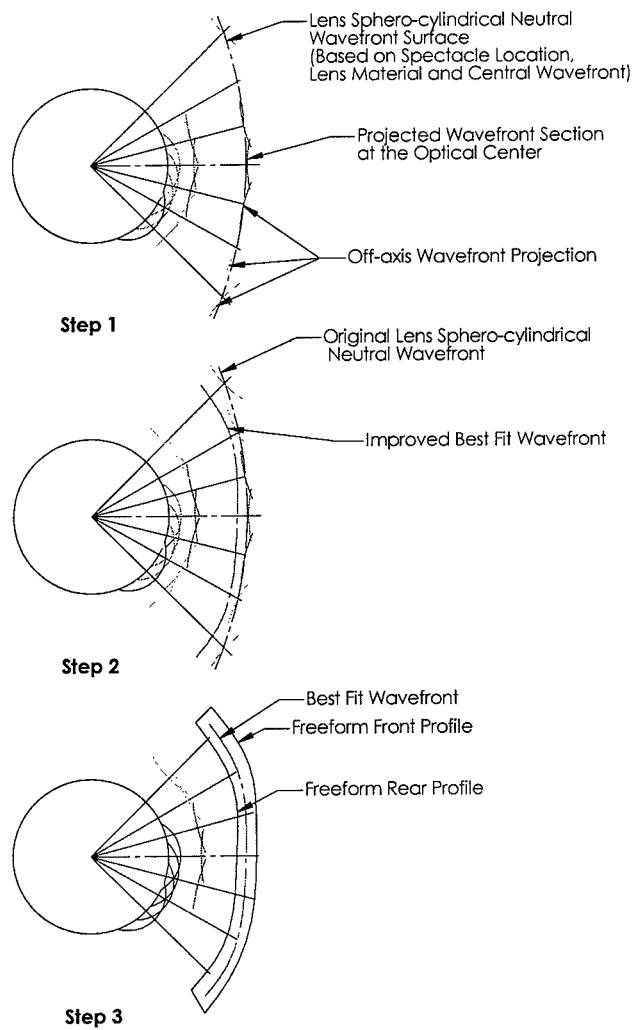
FIG 1 Lens Profile Development Processing Steps

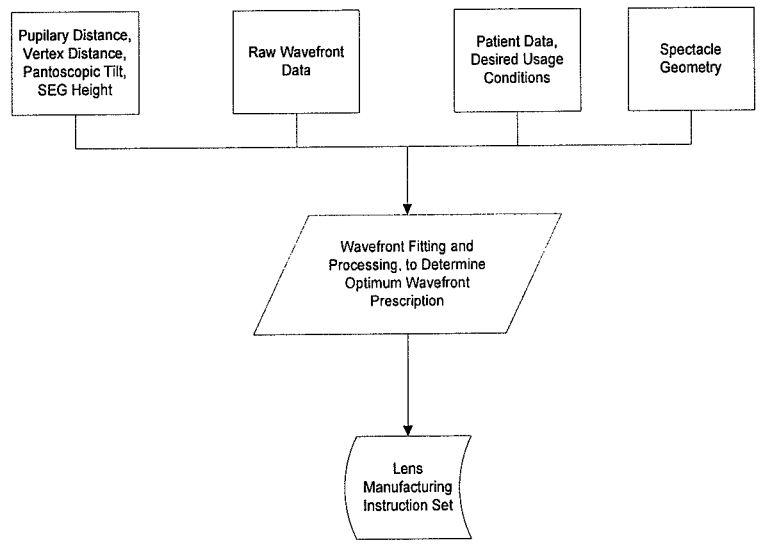
FIG 2 Wavefront Optimization Process
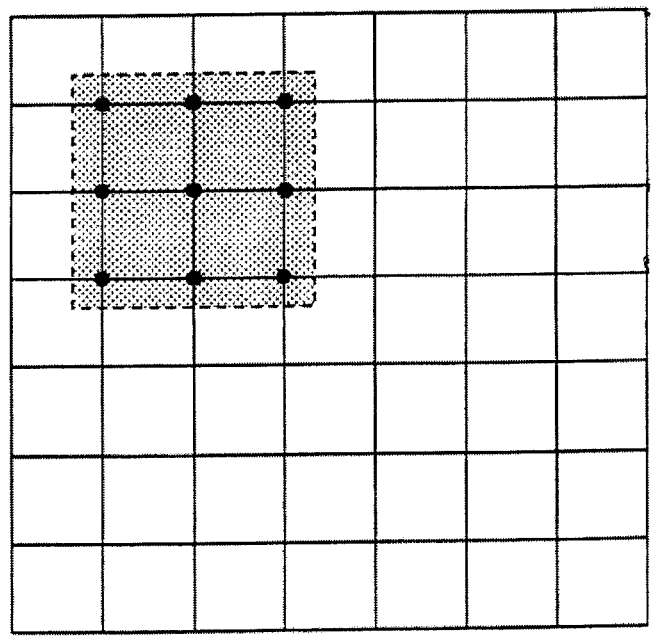
FIG 3

Target Cylinder

Target Sphere

Cylinder Weight

Sphere Weight

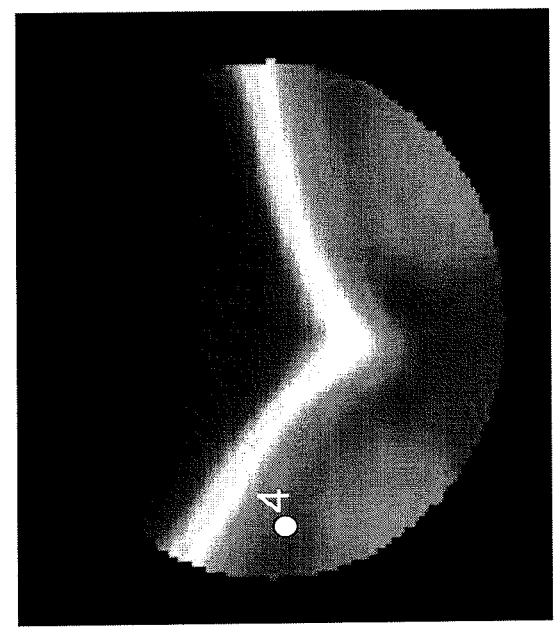
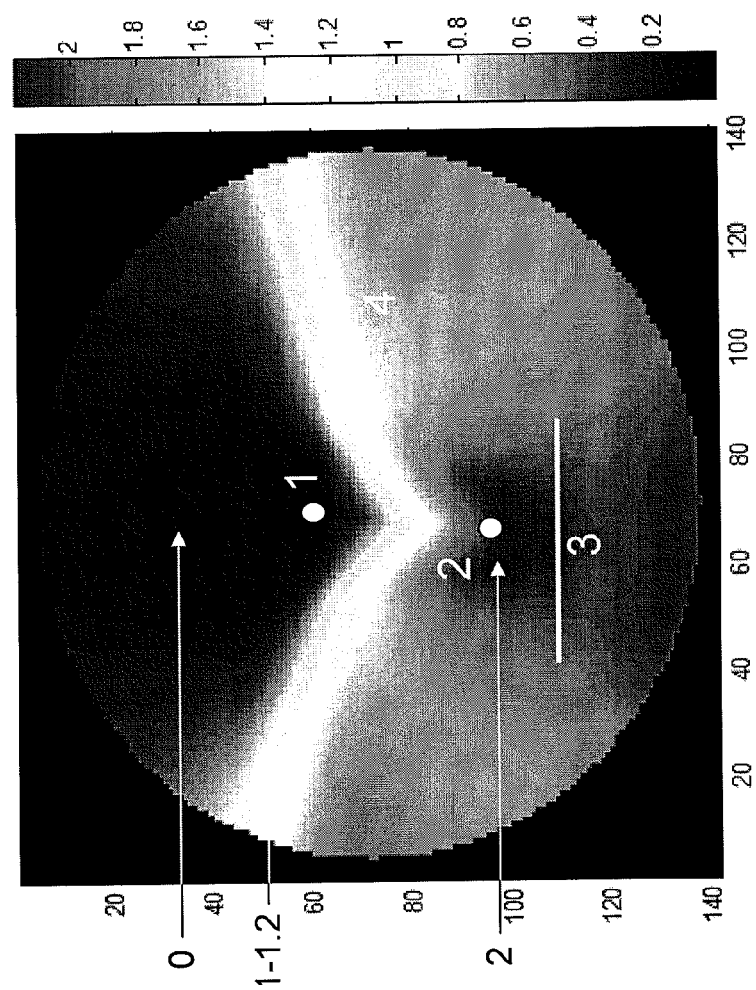
FIG 14B
FIG 14A

METHOD OF DESIGNING PROGRESSIVE ADDITION LENSES

CROSS-REFERENCE TO RELATED APPLICATIONS

This application is the national phase of PCT application PCT/US2009/042399 having an international filing date of Apr. 30, 2009, which claims the benefit of priority under 35 U.S.C §119(e) from U.S. Provisional Patent Application No. 61/125,926, filed Apr. 30, 2008. The contents of these applications are herein incorporated by reference in their entirety.

PRIORITY INFORMATION

This application claims benefit of priority under 35 U.S.C. §119(e) to U.S. Provisional Patent Application No. 61/125, 926, filed on Apr. 30, 2008, the content of which are hereby incorporated herein by reference in its entirety.

BACKGROUND

Ocular lenses are worn by many people to correct vision problems. Vision problems are caused by aberrations of the light rays entering the eyes. These include low order aberrations, such as myopia, hyperopia, and astigmatism; and higher order aberrations, such as spherical, coma, trefoil; and chromatic aberrations. Because the distortion introduced by aberrations into an optical system significantly degrades the quality of the images on the image plane of such system, there are advantages to the reduction of those aberrations.

Ocular lenses are typically made by generating prescriptions in lens blanks. This is accomplished by altering the topography of the surface of a lens blank.

Recently, attention has been given to methods of generating low order prescription in lens blanks using a patient's measured wavefront information. Currently, several techniques can be utilized to determine the optimum low order refraction from the high order, including: the Gaussian Least Squares Fit, point spread optimization, and neural network analysis. Some of these techniques may be employed to not only derive the best low order prescription from the high order values, but may also be used to "fit" an optimum wavefront across an entire spectacle lens based on the patient's measured wavefront.

Using one or more of these fitting techniques may yield a better refraction than conventional subjective refractions in the center zone, but consideration must be given to off-axis gaze angles. In particular, one considerable disadvantage of traditional lens manufacturing is that that many people experience distortion when looking off-center outside the central region, commonly called "swim".

An example of distortion can be present in progressive addition lenses (PAL) that possess both far and near correction (add zone for reading) regions and a progressive power change between the two regions. Due to the progressive power change, which is mostly due to change in front or back radius of curvature, there can be distortion around the near region of lens (swim). The progressive power change can create a channel of varying optical power and two swim regions adjacent to this channel. The power change in the channel can possess smooth transition and, in most instances, may not have any distortion. The swim regions can possess distortion due to off-axis astigmatism and other aberrations. The progressive design can be generated on front side, which is typically cast molded, generated front side, back side, or on both sides. Progressive addition lenses can be used by presbyopic patients to provide focusing at distance and near objects without the abrupt change in power.

There is a need for a method for determining a wavefront for a patient's spectacle based on the patient's measured wavefront, in such a way to reduce distortion when the patient looks off-center, outside a central region of the spectacle. There is also a need for developing progressive addition surface (contour map) based on wavefront optimization and weighting functions that are independent of the lens blank base curves for creating both distance region, near region, transition between distance and near regions, and controlling off-axis astigmatism. In other words, what is needed is a method for combining a patient specific low order prescription surface determined from wavefront refraction (sphere, cylinder and axis as derived from low and high order aberration) measured on wavefront aberrometer with wavefront optimized progressive addition surface to create a PAL customized for a particular individual.

BRIEF SUMMARY

Embodiments of the present invention provide methods for determining a wavefront for a lens from a patient's measured wavefront. The wavefront can be used for producing a spectacle lens with optimal correction across the entire lens, taking into account the patient's complete measured wavefront. Specific embodiments can also take into account one or more additional factors such as vertex distance, segmental fitting height, pantoscopic tilt, frame dimensions to fit the optimized design within the frame, and use conditions.

The lens wavefront can be achieved by optimizing a corrected wavefront, where the corrected wavefront is the combined effect of the patient's measured wavefront and the lens wavefront. In one embodiment of the present invention, the optimization of the corrected wavefront involves representing the measured wavefront and the lens wavefront on a grid. In an embodiment, the grid can lie in a plane. During the optimization, a subset of the grid can be used for the representation of the measured wavefront at a point on the grid so as to take into account the portions of the measured wavefront that contribute to the corrected wavefront at that point on the grid.

Another embodiment involves designing progressive addition surface (contour map) that is specific to the add power and progression of power from far region to near region. The development of the progressive addition surface can involve target sphere power map, target cylinder power map and weighting factors for each of these maps. Final prescription in the form of progressive addition lens design can involve combining the progressive addition surface, including adding power desired by the patient, the low order lens surface based on wavefront refraction determined sphere, cylinder and axis components as measured by the wavefront aberrometer and optimizing the two surfaces to create the customized progressive addition lens best suited for patient selected frames. This approach of making the progressive addition lens design involves using the wavefront optimization that is based on wavefront refraction and includes compensating patient specific and lens specific wavefront aberrations.

BRIEF DESCRIPTION OF FIGURES

FIG. 1 shows the steps for a method for producing a spectacle lens in accordance with an embodiment of the subject invention.

FIG. 2 shows a flow chart in accordance with an embodiment of the subject invention.

FIG. 3 shows a top view of spectacle and pupil samples as images at particular shift (gaze).

FIGS. 14A-14B illustrate spherical output considerations in according to one embodiment.

DESCRIPTION OF EXEMPLARY EMBODIMENTS

Figure 4:
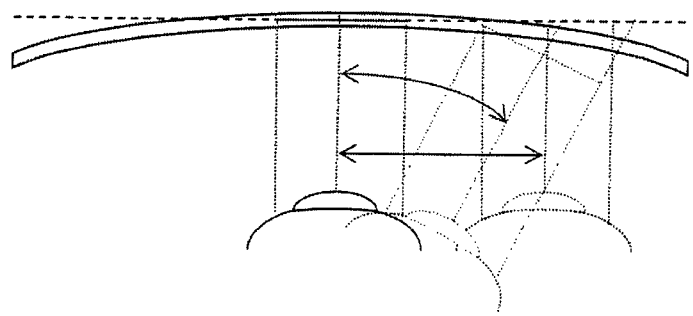
FIG. 4 shows a side view of spectacle and eye, on the left with corresponding dotted lines, with gaze rotation shown by the curved arrow and the rotated eye and corresponding dotted lines the curved arrow is pointing to and gaze shift shown by the straight arrow and the shifted eye and corresponding dotted lines the straight arrow is pointing to on the right.

The subject invention provides methods for determining a wavefront for a lens from a patient's measured wavefront. The wavefront can be used for producing a spectacle lens with optimal correction across the entire lens taking into account the patient's complete measured wavefront. Specific embodiments can also take into account one or more additional factors such as vertex distance, segmental fitting height, pantoscopic tilt, frame dimensions to fit the optimized design within the frame, and use conditions.

The lens wavefront can be achieved by optimizing a corrected wavefront, where the corrected wavefront is the combined effect of the patient's measured wavefront and the lens wavefront. The optimization of the corrected wavefront can involve representing the measured wavefront and the lens wavefront on a grid. In one embodiment, the grid can lie in a plane. During the "wavefront fitting optimization", a subset of the grid can be used for the representation of the measured wavefront at a point on the grid so as to take into account the portions of the measured wavefront that contribute to the corrected wavefront at that point on the grid.

One embodiment of the invention utilizes the hill climbing optimization technique used in the Gaussian Least Squares Fit and point spread optimization software to fit an optimal wavefront across a specified surface larger than that of the measured wavefront. The desired wavefront is projected from a number of points emanating in multiple directions from a nominal axis of rotation representing the center of the eye. The wavefront pattern used can be solely based upon the low order, or can also include some or all of the high order as well.

Each position of the wavefront as projected from the center of the eye can be convolved with a weighting function across the lens to enhance or emphasize the wavefront in certain areas while allowing other areas to be de-emphasized. The wavefront is best fit along a surface representing a paraxial lens representing the neutral axis of a lens. This paraxial lens is fixed in space at a specified central vertex distance and follows the basic lens design curvature of the chosen blank lens. The basic lens design curvature may be simply derived from the central low order prescription or may be used in conjunction with the high order and other factors such as vertex distance.

The progressive addition surface (contour map) prescription may be aspheric and/or atoric possessing progressive addition surface which can be applied to spherical or aspheric lens blanks. The optical lens blank material refractive index can range from 1.4 to 1.8. Examples of optical lens blanks include CR-39 (refractive index of 1.499), Trivex (refractive index of 1.53), Polycarbonate (refractive index of 1.59), 1.6 index material (made of Mitsui monomers MR-8, MR-20), 1.67 index material (made of Mitsui monomers MR-7), 1.71 index material, 1.74 index material, 1.76 index material and any other composite material. The progressive addition lenses can be made with single lens blank or multilayered lens assemblies. The progressive addition surface can be in applied using freeform processing (generation and polishing) or any other mode of grinding and polishing to the front surface of single lens blank or multilayered lens assembly, or to back surface of single lens blank or multilayered lens assembly, or to at least one of the inside surfaces of a multilayered lens assembly, or to changeable refractive index layer within the lens blank (uniform or non-uniform in thickness), or combinations of front and back surfaces of single lens blank or multilayered lens assembly. In a case of applying the progressive addition surface to at least one of the inside surfaces of a multilayered lens assembly, the first lens blank, the middle changeable refractive index layer and the second lens blank possesses different refractive indices. To illustrate by way of example, the first lens blank can be made of refractive index 1.67 or 1.71, the middle layer of changeable index material can possess refractive index ranging from 1.57-1.60, and the second lens blank can be made of refractive index 1.50 or 1.53. The freeform generated progressive addition surface present on one of the inner layers leads to the middle layer of changeable index material possessing non-uniform thickness which may lead wide distance, wide near and intermediate regions and overall design with reduced off-axis astigmatism and magnification.

The final wavefront can be fitted with one or more of the following inputs:
Wavefront
Pupilary Distance Vertex Distance
Pantoscopic Tilt
Segmental Fitting Height
Pupil Diameter
Conditions under which the lens will be used (day, office, night, etc)
Age
OD Subjective refraction
ADD Value
Spectacle Geometry
Refractive Index of the Lens Material FIG. 1 shows the steps for one embodiment of a method for producing a spectacle lens and FIG. 2 shows a flowchart indicating the flow of information in accordance with an embodiment of a wavefront optimization method. In one embodiment, vertex distance and its effect on the lens power and astigmatism can be compensated for in the wavefront fitting process. The output of the wavefront fitting software process (steps 1 & 2 in FIG. 1) is a set of instructions that facilitates production of a custom lens. Software (e.g., PALgo) can be used for a wavefront fitting process. MatLab software can be utilized for optimizing the weighting of target sphere and cylinder maps. An algorithm for PALgo software is described in U.S. patent application Ser. No. 11/963,609 titled "CUSTOMIZED Z-LENS DESIGN PROGRAM," the content of which is hereby incorporated herein by reference in its entirety. The "progressive addition surface" or "contour map" corresponds to the output of the wavefront fitting optimization. The "progressive addition lens design" corresponds to the combined and optimized progressive addition surface and patient specific low order surface.

Various techniques may be utilized to generate the actual lens. For example; the instructions may include a surface map for front and/or back surfaces of a lens, or a points file that can be fed into a freeform lens generator, to cut custom front, or custom back, or custom front and back surfaces. Other approaches may utilize a changeable refractive index layer within the lens blank (or sandwiched multilayered lens assembly with thin wafer and thick base lens) that can be customized with the information from the fitting software. The sandwiched multilayered lens assembly is made of two lens blanks or lenses with a layer of changeable refractive index sandwiched in between the two lens blanks or lenses. The changeable refractive index layer changes its refractive index when exposed to electromagnetic radiation. The sandwiched multilayered lens assembly with changeable refractive index layer is described in U.S. Pat. No. 6,712,466 titled "EYEGLASS MANUFACTURING METHOD USING VARIABLE INDEX LAYER," the content of which is hereby incorporated herein by reference in its entirety. Yet another approach can use an inkjet deposition of different refractive indices across a lens surface to generate a corrected wavefront based on the fitting software output. In yet another approach, stereolithography may be used in conjunction with casting, or combination of any of the above techniques can be combined to achieve the custom lens manufacturing.

Step 3 in FIG. 1 represents a freeform grinding approach to lens manufacturing. Casting, inkjet, and sandwiched changeable refractive index approaches as known in the art, can also be utilized. The sandwiched multilayered lens assembly is described in U.S. Pat. No. 6,712,466 titled "EYEGLASS MANUFACTURING METHOD USING VARIABLE INDEX LAYER", U.S. Pat. No. 7,234,810 titled "SYSTEM FOR MANUFACTURING AN OPTICAL LENS", and U.S. Pat. No. 7,371,804 titled "MONOMERS AND POLYMERS FOR OPTICAL ELEMENTS," the content of each of which is hereby incorporated herein by reference in their entireties.

If utilizing the freeform grinding approach the final step in the wavefront fitting software can generate shape of the front and back surface of the lens to achieve the given wavefront. Development of the shape of the front and back surface can also take into account the distortions from lens thickness variations to minimize distortions. The output of the fitted wavefront software can, in an embodiment, be a points file, which can subsequently be transferred into a freeform lens generator for manufacturing the lens. The resulting lens can be essentially optimized across the entire lens and customized for each patient based on all the input parameters. This freeform grinding technique can be utilized in conjunction with the refractive index changing material to further tune or enhance the refractive properties after lens grinding and polishing.

In one embodiment, a grid of shifts (rather than rotations) for measured and target pupil wavefronts is used, represented mathematically by images. The target wavefront can be used as the lens wavefront. From the measured wavefront, the target wavefront can be determined via one or more embodiments of the invention. A variety of configurations can be used to implement the target wavefront via an eyeglass for the patient.

As an example, a single lens with two surfaces can be used to create an eyeglass for a patient, where one or both of the lens surfaces can be controlled to modify the wavefront for the lens. Alternatively, two lens blanks each having two surfaces can be used with a variable index polymeric material between the two lens blanks, where one or more of the four lens blank surfaces and/or the polymeric material can be controlled to effect the wavefront for the lens. The lens surface(s) and/or variable cured index of the polymeric material of the polymeric material are described in a two-dimensional plane corresponding to the height of the surface(s) or the projection of the index layer(s) onto a plane.

Aberrations are measured as components in an orthogonal expansion of the pupil sampled on the same grid spacing. In a specific embodiment, the grid spacing is about 0.5 mm and in another embodiment the grid spacing is about 0.1 mm. In an embodiment using Zernike polynomials, the components can be made orthogonal for the chosen pupil size due to discrete sampling. As an example, the components can be made orthogonal through a process such as Gram-Schmidt orthogonalization. Orthogonal components of aberrations for pupils centered at a specific point on the spectacle may then be computed by sample-by-sample multiplication (inner product) of the aberration component image with the lens (height or projection) image centered at the point of interest, as in FIG. 3. FIG. 3 shows a top view of spectacle and pupil samples as images at particular shift (gaze), which can be used for computation of aberrations for pupils having a diameter of 3 samples, centered at a chosen coordinate on a spectacle grid having a diameter of 8 samples.

Zernike polynomials are orthogonal and when samples are taken, approximations of Zernike polynomials can be created. In one embodiment, the approximations of Zernike polynomials can then be modified to make orthogonal polynomials, so as to create new polynomials.

In an embodiment, points on the pupil outside the pupil diameter are assumed zero. Non-squared pupil shapes may be formed by zeroing select points within the square of pupil diameter. Mathematically, the process of computing the inner product centered at all possible locations on the grid is a cross correlation, which may be implemented with a fast convolution algorithm. An image can be produced for each Zernike via the cross-correlation. The image for each Zernike can be used to create a target and an error. The error can be used to produce an error discrimination, or a weighted sum of all pixels in the image square.

In a specific embodiment, a grid size and spacing is chosen to represent the lens and pupil in a plane. An example of such a grid is shown in FIG. 3. The aberrations of interest are orthogonalized on the grid at the chosen pupil size. Then a given aberration centered at every point may be estimated by cross-correlation of the orthogonalized Zernike image and the spectacle image, resulting in an image for each Zernike component. An error image for each point on the lens may be estimated as a difference between the computed and desired Zernike aberration centered at each point in the image.

The desired correction is, to a first approximation, assumed to be constant in this plane with a shift corresponding to a given gaze angle. The rotation is otherwise neglected as shown in FIG. 2. For large gaze angles, the effect of rotation can be compensated by providing a spatially-varying correction target. The spatially-varying target can be approximated by rotating the paraxial target.

Simple convolution may be replaced with a more exact geometric calculation of the ray-surface intersection corresponding to a ray-tracing-style algorithm over a fixed grid. Other grid geometries may be used (e.g., hexagonal instead of rectangular). The result is essentially a spatially varying sample spacing and convolution, increasing computation time.

Other metrics of surface error may be computed from the Zernike component error images, as done with single pupil representations. Images of sphere/cylinder/values (or errors from desired) may be computed by applying the usual conversion on a pixel-by-pixel basis for example.

Total root-mean-square (rms) may be represented by either the sum of all component terms squared for a particular pupil location, or the sum of all pixels squared (and properly normalized) within the pupil. This may be achieved by cross-correlations of a pupil-sized aperture of ones with an image of the lens values squared. Total high order may be computed by subtracting the low order aberration images from the total rms image. High order error may be computed by also subtracting the target high order images, squared pixel-by-pixel. For certain error choices optimizing error this may be mathematically equivalent to known regularization algorithms.

A total error discriminant may be generated by summing desired error images over the entire lens. A pixel-by-pixel weighting may be incorporated to selectively weight the error at various regions in the lens, and this may be done independently for each Zernike component. Standard optimization procedures (e.g., convex programming) may be used to produce a lens image that minimizes the error discriminant. If the lens image is sufficiently small, the cross-correlation may be represented as a matrix multiplication further simplifying the application of optimization algorithms known in the art. For larger image sizes this may be impractical, but may still be used to adapt the algorithm to the problem before implementing with fast convolution algorithms.

Constraints on the error may also be used in the optimization that would be represented by constraint images of max and/or min Zernike components or functions thereof. An example of a constraint that can be utilized is that the error for a certain Zernike cannot be above a certain threshold for a certain area.

Free-floating points, such as boundaries, may be handled by setting weights to zero or very small for those points. This allows the optimized region to be smaller than the actual grid, the optimized region to have an arbitrary shape, and/or the optimized region to only be optimized for points that will ultimately be used. In a specific embodiment, the patient-selected frame outline may be input as the region of optimization. As there can be an infinite number of solutions, an attempt can be made to optimize a certain shape inside of the lenses, such as the spectacle shape. An example of a certain shape that can be optimized is to optimize within the shape of the frame that the lens will be used by, for example, using a zero weight outside of the frame.

Fixed points, which are given prior to optimization and remain unchanged, may be provided by using the points to compute correction but not applying it to them in the optimization algorithm. This can be used for boundaries, so as to only optimize for certain portions of lenses.

Grid(s) of constraints may be converted into a weighting and/or target (for unconstrained optimization) via a separate optimization procedure.

Multiple surfaces may be optimized simultaneously. As an example, two grids can be optimized simultaneously or each grid point can have two numbers associated with it to be optimized.

The patient's prescription (including high order) may be used as target, including deterministic variations with gaze if available.

Progressive addition lenses have low-order correction in a pair of zones, with some varying power along a line connecting them. In one embodiment, the rest of the lens is then optimized to reduce distortion. Further, the lens can be optimized to similarly reduce distortion. The lens can be optimized to reduced distortion via, for example, power matching, matching second order wavefronts only, or full-wavefront matching with a varying tilt.

Additionally, one embodiment relates to a method of designing progressive addition lenses (PAL) in order to optimize the desired properties of the PAL. The method of designing a PAL comprises evaluating the following factors in order to produce an optimized PAL for a desired result:

(a) a target sphere map,
(b) a target cylinder map,
(c) a sphere weighting map, and
(d) a cylinder weighting map whereby the resulting PAL is optimized. Optionally, a high order target map and a high order weighting map can be considered in the evaluation if the lens is designed to correct for high order aberrations, such as, for example, coma, trefoil and spherical aberrations. Suitable PALs include traditional PAL designs that provide for near, far and intermediate vision correction and work or computer designs that are used for near (reading) and intermediate (computer, work station) vision correction.

Figure 5:
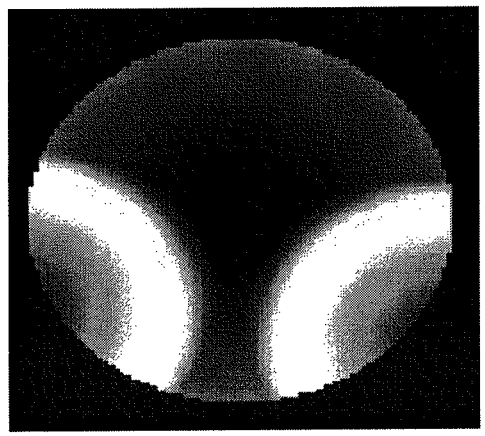
FIG. 5 depicts a cylinder map and a cylinder weighting map modeled as two semi circles centered at opposite sides of a chord to the circle in accordance with one embodiment.
Figure 6B:
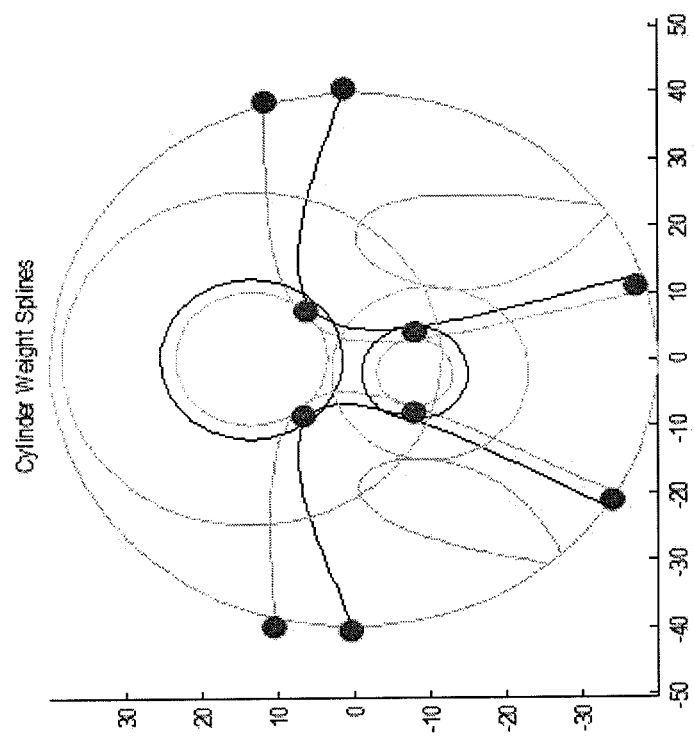
FIGS. 6A-6B illustrate exemplary shaped peripheral zones in accordance with one embodiment using Spline software.
Figure 6A:
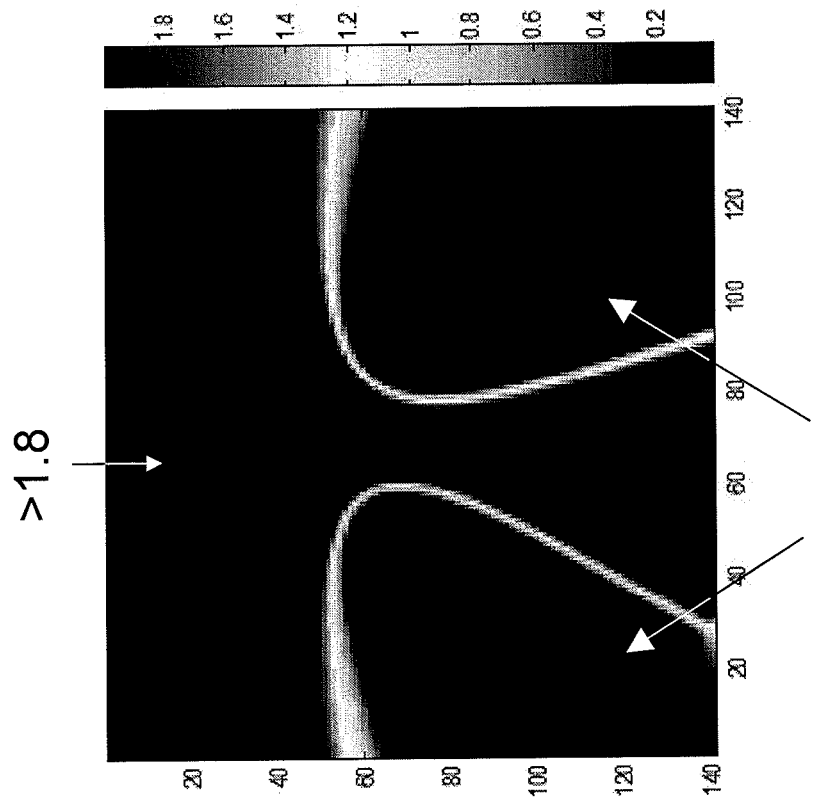
Figure 7B:
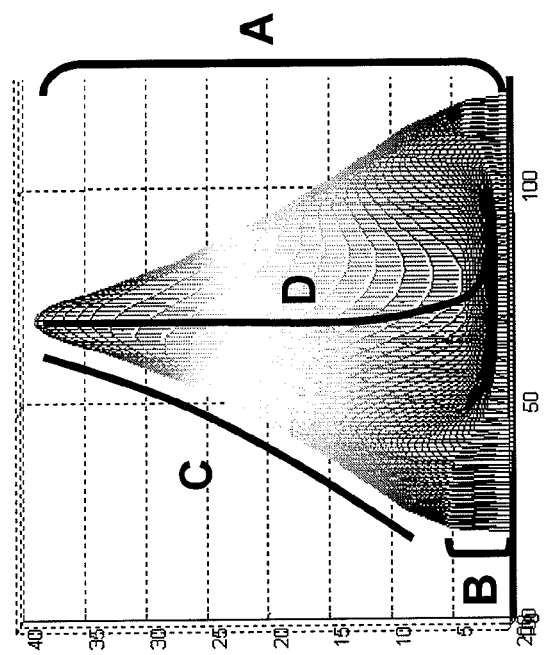
FIGS. 7A-7B illustrate exemplary weighting values used to control factors in accordance with one embodiment.
Figure 7A:
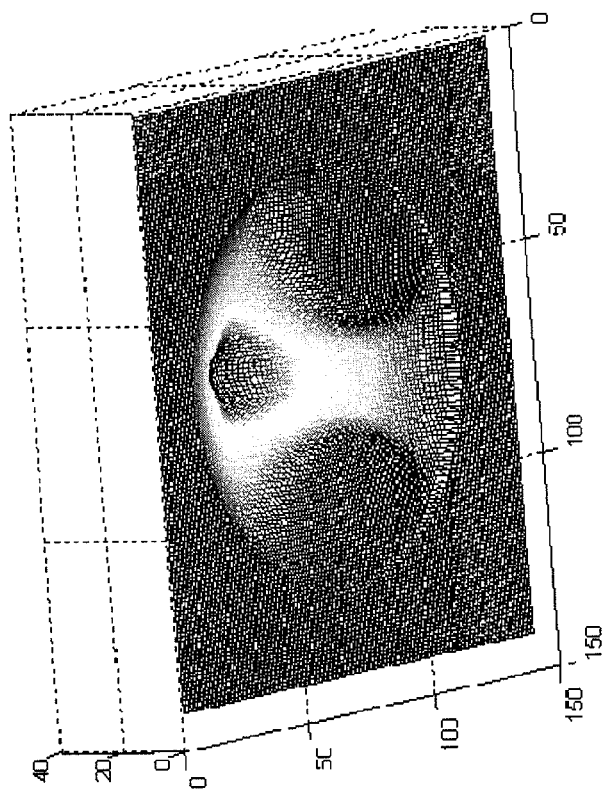
Figure 8A:
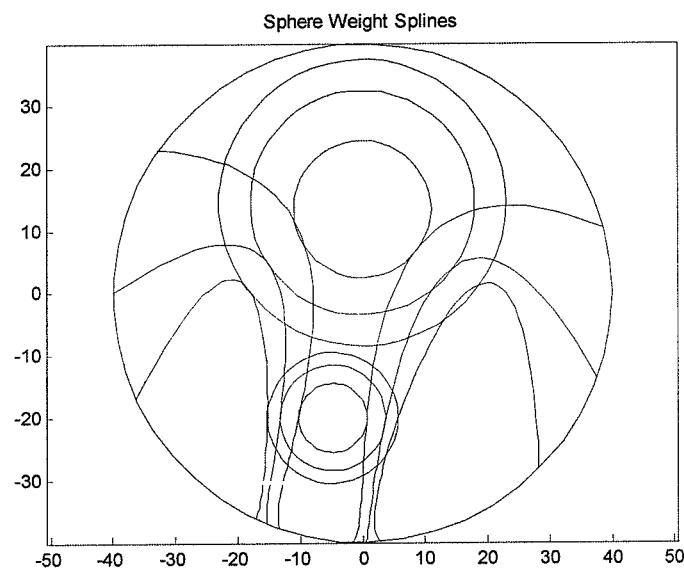
FIG. 8A illustrates taking into account astigmatism contours in accordance with one embodiment.
Figure 8B:
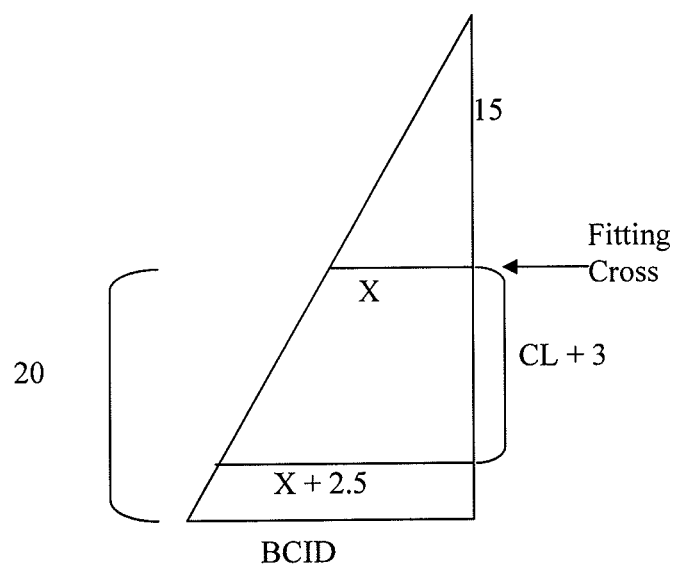
FIG. 8B illustrates a bottom circle inset distance (BCID), where X represents the horizontal inset from the top circle center to the fitting cross and CL represents the channel length in accordance with one embodiment.

The cylinder map and the cylinder weighting map can be modeled as two semi circles centered at opposite sides of a chord to the circle as depicted in FIG. 5. This will work well to gain an understanding of the tradeoffs and design parameters and characteristics. However, it will lack a precise control over zone shapes. In FIGS. 6A and 6B, Spline software can also be used for shaping peripheral zones. In FIG. 6A the top portion of the cylinder map (distance region) shows >1.8 unit of power while the two off-axis astigmatism locations present adjacent to the reading area possess 0-0.2 unit of power. In FIGS. 7A and 7B, the weighting values are used to control factors such as maximum weighting value (A), the weighting value at the edges of useable areas (B), the control rate of weighting changes in useable areas (power function) (C) and the control rate of weighting change in the periphery of the lens (D). In one embodiment, the astigmatism contours reach into the top half of the lens without affecting the corridor width or near zone width thereby reducing magnification problems that may arise when the astigmatism contours remain at or below the middle of the lens. Adding an inset to the PAL design can be accomplished by taking into account the astigmatism contours which can be seen in FIG. 8A. The top circles and the bottom circles in FIG. 8A that define the astigmatism contours are centered at heights of 15 mm above the vertical midpoint of the lens and 20 mm below the vertical midpoint of the lens respectively. In one embodiment a 2.5 mm horizontal inset is defined at 3 mm greater the corridor length below the fitting cross, i.e., at −18 mm for a 15 mm corridor. The bottom circle inset distance (BCID) is illustrated in FIG. 8B where X represents the horizontal inset from the top circle center to the fitting cross and CL represents the channel length.

Figure 9A:
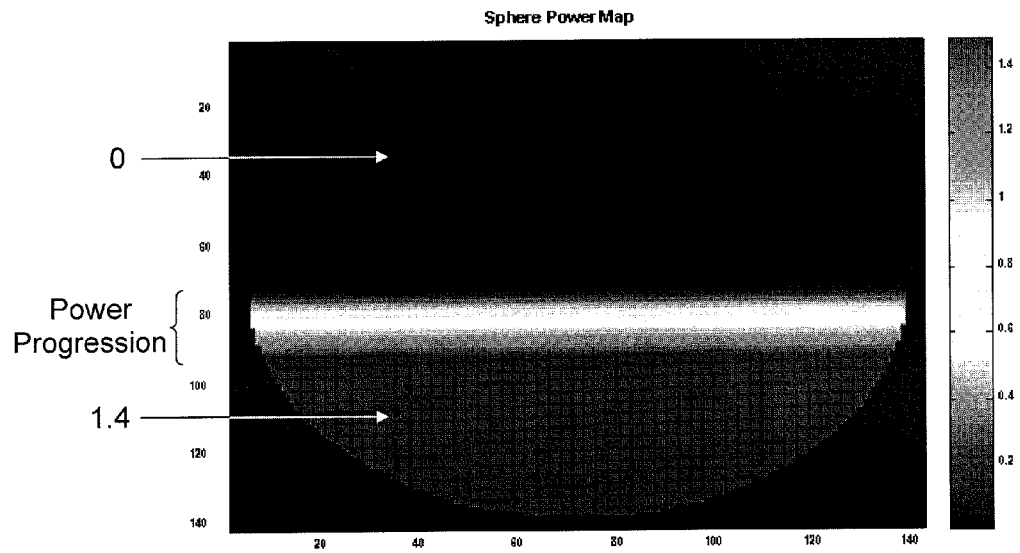
FIGS. 9A-9B illustrate exemplary sphere power maps in accordance with one embodiment.
Figure 9B:
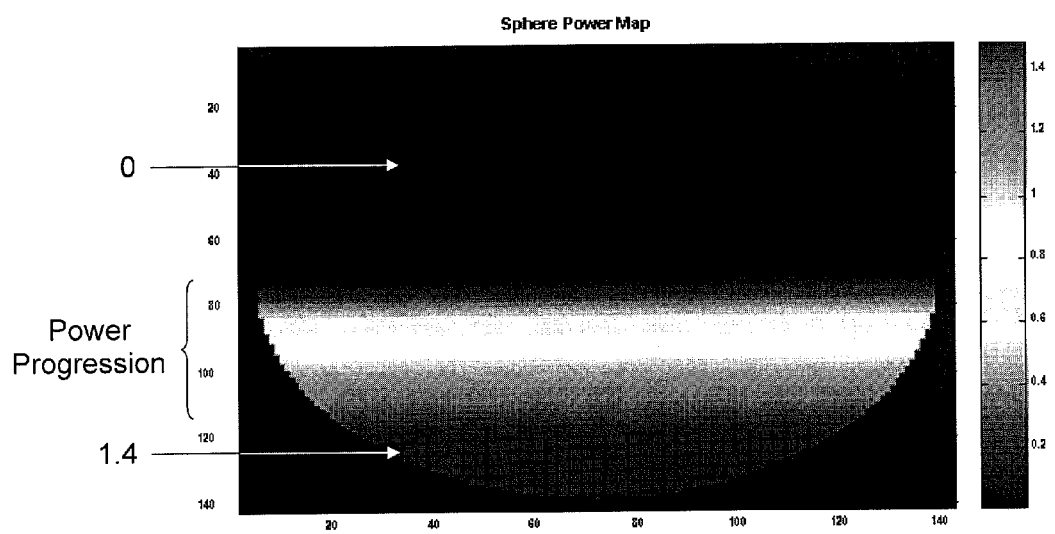
Figure 10A:
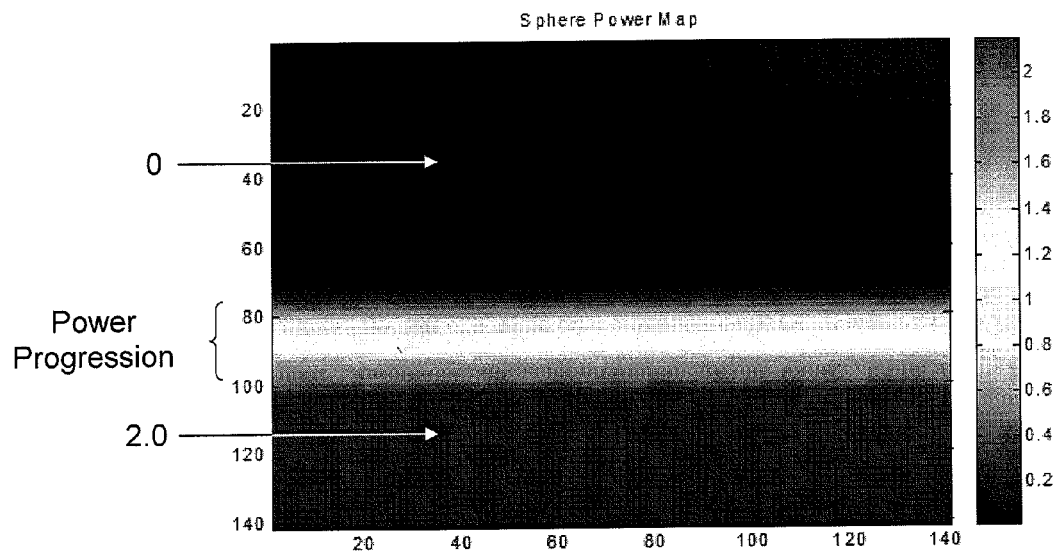
FIGS. 10A-10B illustrate exemplary sphere power maps in accordance with one embodiment.
Figure 10B:
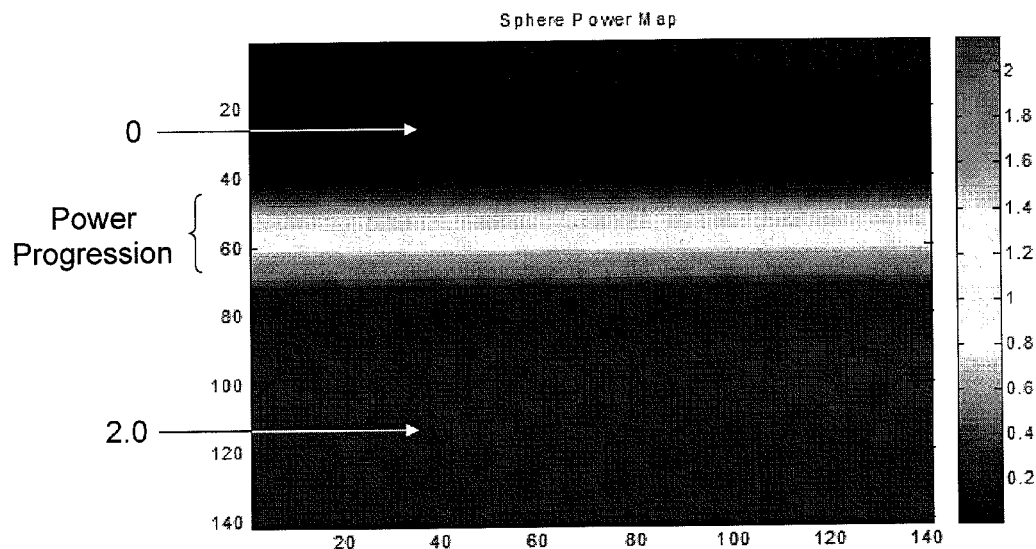

In FIGS. 9A and 9B and FIGS. 10A and 10B, power progression (width of progressive power that controls the channel length with zero horizontal magnification change) and control height (location of progressive power) at which power progression begins can also be considered in designing the PAL according to one embodiment. In FIGS. 9A and 9B which represent a design option of certain corridor or channel length, the sphere power map for the top half portion corresponding to the distance region of the power map possesses 0 unit of power while the bottom portion corresponding to the reading region of the power map possesses 1.4 unit of power. The main difference in both FIGS. 9A and 9B is the width of power progression. In FIG. 9A the power progression is narrow band ranging from approximately 70 to approximately 90 units in the lens design while in FIG. 9B the power progression is broad band ranging from approximately 70 to approximately 120 units in the lens design. In FIGS. 10A and 10B which represent a design option of same corridor or channel length, the sphere power map for the top half portion corresponding to the distance region of the power map possesses 0 unit of power while the bottom portion corresponding to the reading region of the power map possesses 2.0 unit of power. The main difference in both FIGS. 10A and 10B is the location of power progression. In FIG. 10A the power progression is band located between approximately 70 and approximately 100 units in the lens design while in FIG. 10B the power progression is band located from approximately 40 to approximately 70 units in the lens design. Input maps for a wide PAL design which include a target cylinder map (the power for cylinder map is maintained at 0D), a target sphere map (the power for sphere map progresses from 0 to 2D), a cylinder weight map and a sphere weight map are shown in FIGS. 11A-D.

Figure 11A:
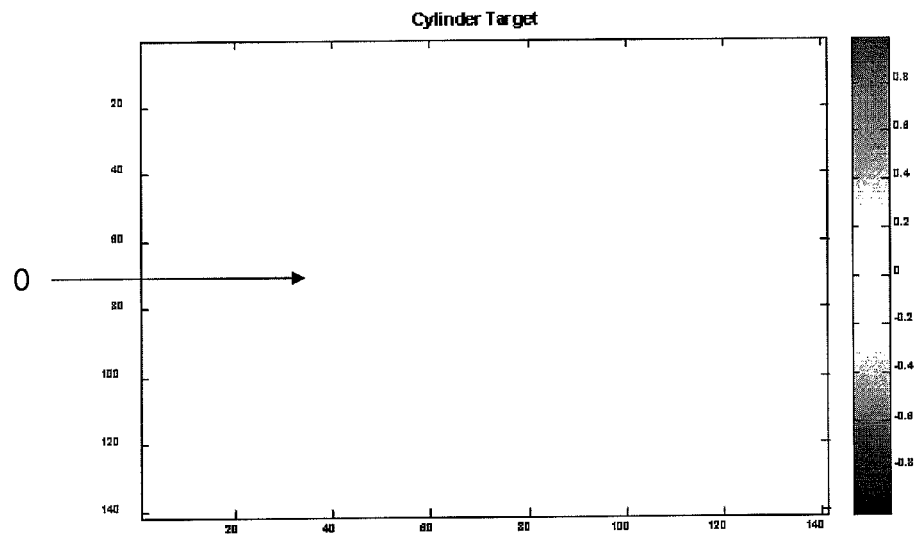
FIGS. 11A-11D show input maps for a wide PAL design which include a target cylinder map, a target sphere map, a cylinder weight map and a sphere weight map in accordance with one embodiment.
Figure 11B:
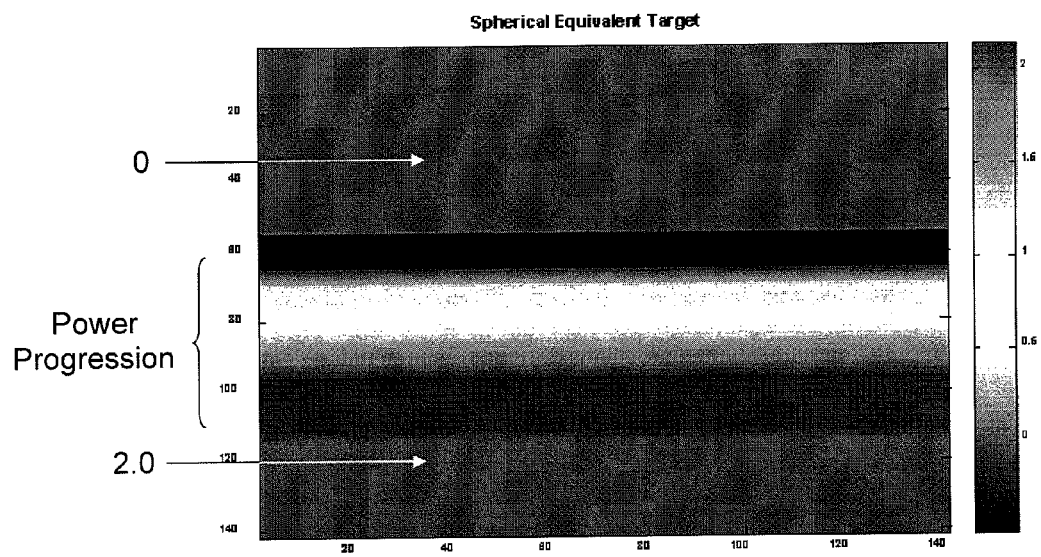

In FIG. 11A which represents a Target Cylinder map, the power of the entire map is set to 0 units of power. FIG. 11B represents a Target Sphere map for the top half portion corresponding to the distance region of the power map possesses 0 unit of power, where the bottom portion corresponding to the reading region of the power map possesses 2.0 unit of power, and the power progression is band located between approximately 50 and approximately 110 units in the lens design.

Figure 11C:
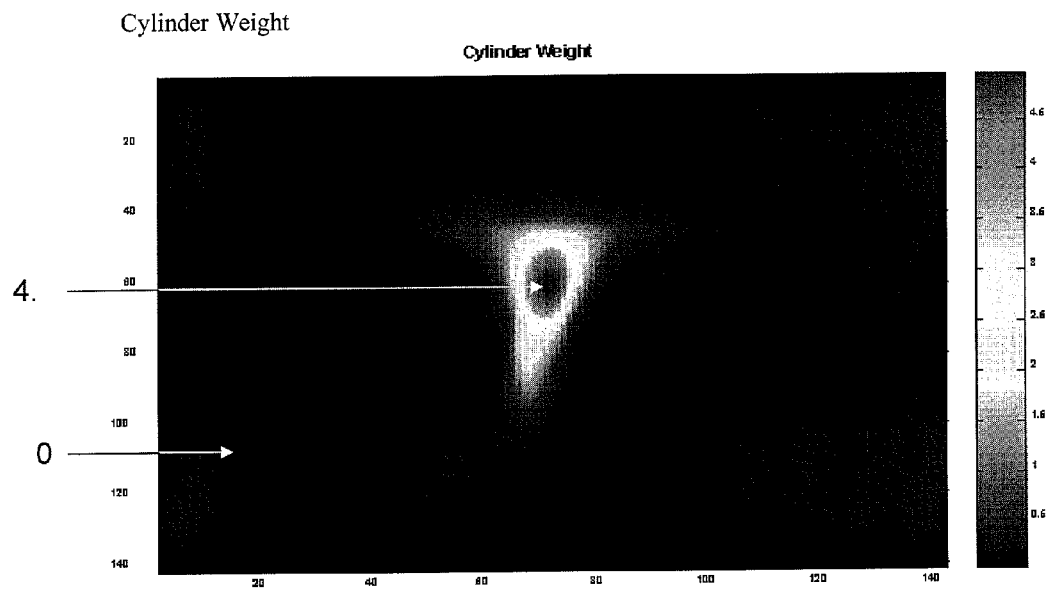
Figure 11D:
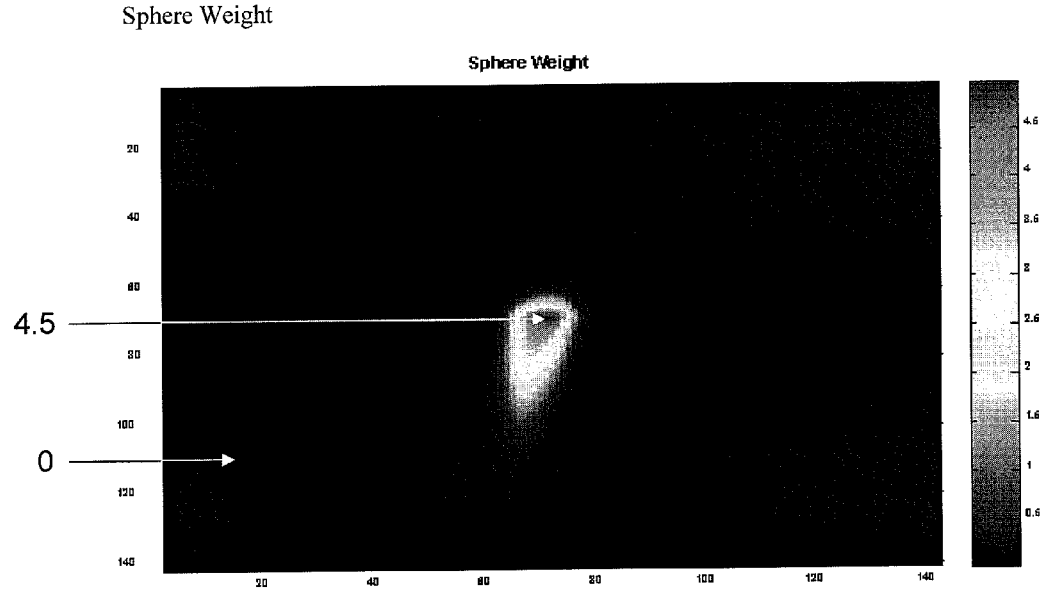

In FIGS. 11C and 11D, which represent a cylinder and sphere-weighting map respectively, the weighting in the center of the map is set to 4.5 unit of weight while the other region is set to 0 unit of weight. The outputs from this design are shown in FIGS. 12 A-C and include cylinder, sphere and surface height maps.

Figures 12A, 12B, 12C:
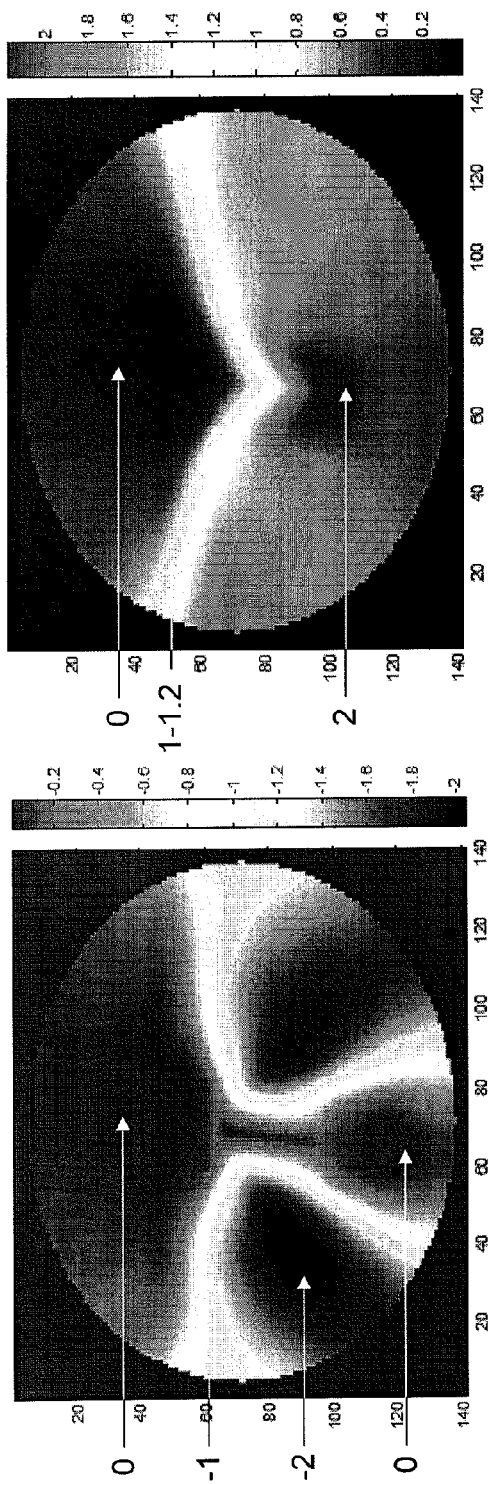
FIGS. 12A-12C illustrate exemplary outputs from the design of FIGS. 11A-11D in accordance with one embodiment.

In FIG. 12A, which represents a cylinder power map of the progressive design, the central band from distance region located at the top to the reading region located at the bottom of the power map possesses 0 unit of power, the off-axis astigmatism adjacent to the reading region possesses −2 unit of power, and the boundary between off-axis astigmatism and the distance region possesses −1 unit of power. In FIG. 12B, which represents the sphere power map of the progressive design, the distance region located at the top possesses 0 unit of power, the reading region located at the bottom possesses 2 unit of power and the boundary between the distance and reading region possesses 1-1.2 units of power in the power map. In FIG. 12C which represents the side view of the progressive addition surface power map, the X, Y, and Z directions are shown in the legend and the region A corresponds to the points file for the distance region and the region B corresponds to the points file for the progression of power and near region. The Z-axis scale is shown on both the axis on the as well as the grayscale bar on the right side of the Figure. The region between −200 and +75 unit on Z-axis represent the distance region, the region between +75 to +250 to +75 unit on Z-axis represent the intermediate and progression of power, and the region between −200 and −300 unit on Z-axis represent the reading power.

Figure 13:
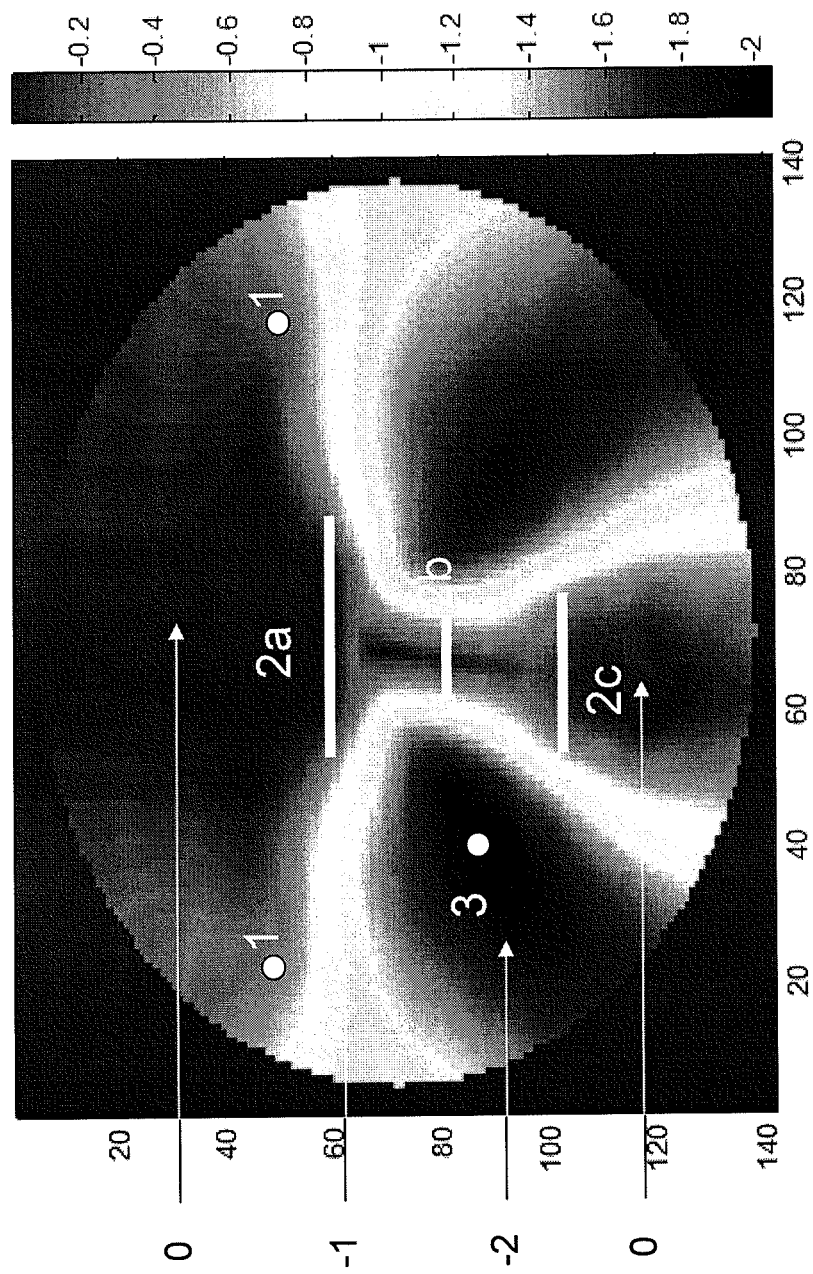
FIG. 13 shows output considerations that are used in a PAL design according to one embodiment.

FIG. 13 shows output considerations that can be used in the PAL design. These considerations include 1 how far the cylinder contours reach up into the periphery of the far zone, the width of the far zone 2a, the width of the intermediate channel 2b and the width of the read zone 2c and what is the maximum cylinder value and where is it located 3. In FIG. 13, which represents the cylinder power map of the progressive design, the central band from distance region located at the top to the reading region located at the bottom of the power map possesses 0 unit of power, the off-axis astigmatism adjacent to the reading region possesses −2 unit of power, and the boundary between off-axis astigmatism and the distance region possesses −1 unit of power. Spherical output considerations, illustrated in FIG. 14, include the sphere value at the fitting cross 1, the target add value achieved and it height 2, over what distance is 90% of the add power present 3, and will swimming and/or disruptive magnification be present in the periphery 4. The wavefront fitting optimization limits astigmatism in the lens to no more than 2 diopters, which in turn limits the horizontal and vertical magnification. In FIG. 14A which represents the sphere power map of the progressive design, the distance region located at the top possesses 0 unit of power, the reading region located at the bottom possesses 2 unit of power and the boundary between the distance and reading region possesses 1-1.2 units of power in the power map.

The present PAL design surface can be added to the low order lens prescription surface to make the final PAL. Progressive design libraries (maps) with different add powers, corridor lengths, inset distances and other desired parameters can be made for convenience in manufacturing PALs. In other words, the progressive addition surfaces are stored in a computer database comprising multiple progressive addition designs possessing distance and near distances at different heights and near inset locations based on gaze angle. The progressive design map can then be added to the low order map to get the patient's prescription. However, the specific base curves employed and the particular low order values must be monitored to make sure that the perceived add power does not change for a particular progressive map. The design libraries can also have a variable inset (~5-15 and 0 degrees) for all add powers to ensure proper convergence in the near (reading) zone.

In one embodiment the highest weighting is assigned to the geometrical center of the weighting map and then the weighting map is raised to the $n^{th}$ power to further emphasize the weighting at the center of the map. Raising the weighting map to the 8$^{th}$ power is sufficient to minimize the cylinder and sphere errors at the geometrical center of the lens.

In another embodiment, customization of PAL designs may be tested with patients before the patient's lenses are manufactured. Many patients who have an add requirement over +2 D complain that the near vision zone is too small. Unfortunately neither the patient nor the doctor will know that the near vision zone is too small until after the patient actually wears the lenses. By simulating what looking through certain zones on a lens will look like before the patients get their glasses can alleviate this problem. A library of PALs is made and then added a program like Z-Vision (Ophthonix Inc. proprietary software capable of utilizing Zernike polynomials to simulate human vision and aberration using ETDRS chart) or Zemax to simulate what images would look like while looking through certain regions of the lens. Simulated images of a design comparable to that which the patient is currently wearing would be done for current PAL wearers. New designs could also be evaluated before the glasses are made. For first time PAL wearer, it would be best to start by simulating image as seen through an overall design that is optimized for a balance between far, intermediate, and near vision quality. After giving the patient a starting point, they could then manually adjust the quality (or area over which good quality exists) of the far, intermediate, or near vision zone images. Of course if the patient decided to increase the quality/size of the far vision zone, the quality/size of the near and/or intermediate zones would be compromised as a result, and vise versa. This embodiment serves not only as a customization tool to make the best lenses for a patient, but it would also serve as an educational tool to help patients understand the inherent tradeoffs involved in PAL design. For example, a patient may learn that a PAL may not be able to provide undistorted vision through all points of the lens. This teaching could provide an unprecedented level of customization in prescribing PALs. To illustrate, some patients may prefer to be able to read only a half page of text clearly at a time, but have an improved, crisp far vision zone for driving. On the other hand, some patients may be willing to sacrifice some far vision size to be able to clearly read a full page of text. The lenses can then be made according to the patient's preferences.

It is understood by one of skill in the art that PAL designs may involve tradeoffs. A short corridor can result in rapid power progression, high astigmatism, a narrow intermediate channel and high magnification. A wide intermediate channel and low astigmatism can result in a slow power progression and larger fitting height. To achieve a short fitting height, the fitting cross may be moved down to an intermediate channel, which may result in a low far vision rating by users. Large far and near zones can result in a high astigmatism, high magnification and a narrow intermediate channel. The factors used in one embodiment to design a PAL, result in an entire lens surface profile, and sub-optimum areas cannot be changed without changing other areas. In other words, one series of target maps and weight maps result in the creation of one lens surface.

An exemplary method of designing PALs involves optimizing a two-dimensional optical path difference (OPD) so that it will be as close as possible to target Zernike values at each point. Zernike values are well known to one of skill in the art and are a set of features for describing a surface, similar to slope and curvature. Zernikes are used as a way to have high order and low order aberrations on an equal footing for algorithms. Algorithms for PALgo software is described in U.S. patent application Ser. No. 11/963,609 titled "CUSTOMIZED Z-LENS DESIGN PROGRAM," the content of which is hereby incorporated herein by reference in its entirety.

EXAMPLES

Using the wavefront optimization algorithm (PALgo) along with the target sphere, target cylinder, sphere weighting map and cylinder weighting map, several progressive addition surface maps and designs were created. Astigmatism and sphere maps of four progressive addition designs are shown in FIGS. 15A-B, FIGS. 16A-B, FIGS. 17A-B- and FIGS. 18A-B. In all of the examples describe below, horizontal and vertical magnification is controlled in such a manner that the weighting function limits the off-axis astigmatism to be less than −2.5D more preferably less than −2D. These designs are all based on creation of the wavefront optimized progressive addition surface, "patient specific refraction" which means distance power and add power determined by optometrist or wavefront based refraction (as measured using a wavefront aberrometer which determines the low order aberrations based on high order aberration for distance vision and/or near vision), frame selection, personal use and including other features such as inclusion of tints, photochromic dyes, etc. and coating such as hard, AR, superhydrophobic, mirrors, etc. The patient specific refraction may also include wavefront based refraction for distance vision, wavefront based refraction for near vision, optometrist based refraction for distance vision, and optometrist based refraction for near vision, or any combination thereof. In all of the progressive designs created, there is insignificant difference in the sphere and cylinder power maps for distance power ranges from −10D to +8D and near or reading power ranging from +0.5D to +4.0D for the different corridor lengths ranging from minimum fitting height (measurement height corresponding to distance between fitting cross (location of center of pupil on the lens) to bottom of the frame) of 14 to 24 mm. This is due to the fact that the progressive lens designs are created for each add power and then combined with the low order prescription desired for each individual patient.

Example 1

Figure 15A:
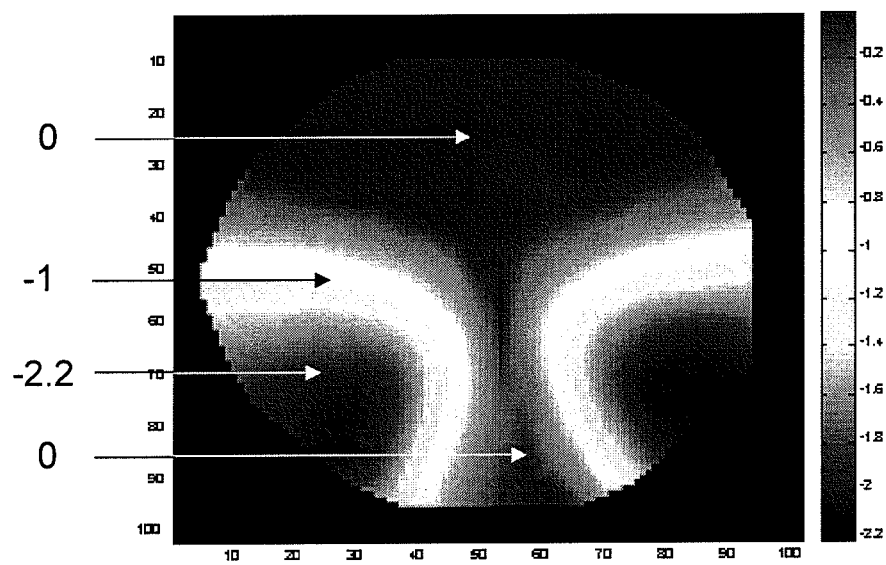
FIGS. 15A-15B show astigmatism and sphere maps of a design optimized for wide distance and near region with astigmatism in near region in accordance with various embodiments.
Figure 15B:
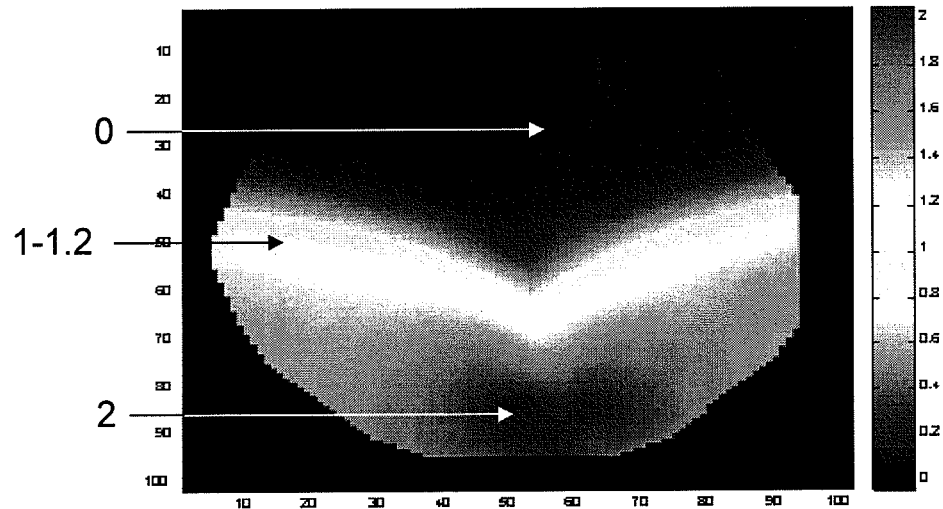

FIGS. 15A-B show the sphere and astigmatic maps for a customized progressive design for plano lens with +2D add power where the design is optimized for wide distance region and substantial near region with some astigmatism in near region. FIG. 15A is a representation of the cylinder power map with the distance and reading regions possessing 0 unit of power while the off-axis astigmatism adjacent to the power progression possesses −2.2 unit of power while the boundary region between the off-axis astigmatism and the distance region possesses −1 unit of power. FIG. 15B is a representation of the sphere power map with the distance region possesses 0 unit of power, the reading region possesses 2 unit of power and the boundary between the reading and distance region possesses 1-1.2 unit of power. The corridor length for this design can be varied to fit with in the frame with minimum segmental height of 16 to 22 mm. The progression of add power may range from +0.50D to +4.00D. The fitting cross can be located at 0, +2, or +4 mm above the 180 line (located on the geometrical center). The inset is variable from 0-15 degrees of gaze angle which comprises inset ranging from 0 to more than 5 mm.

Example 2

Figure 16A:
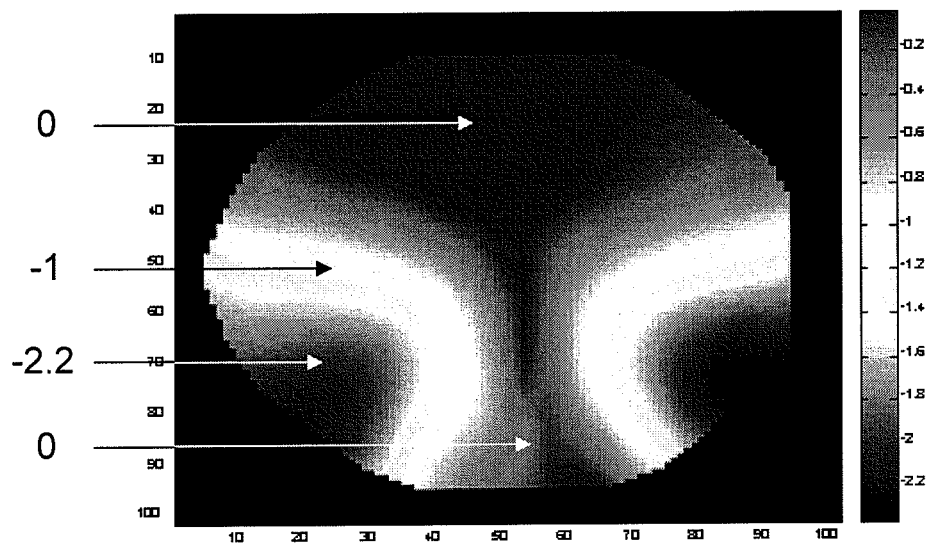
FIGS. 16A-16B show astigmatism and sphere maps of a design optimized for long corridor length in accordance with various embodiments.
Figure 16B:
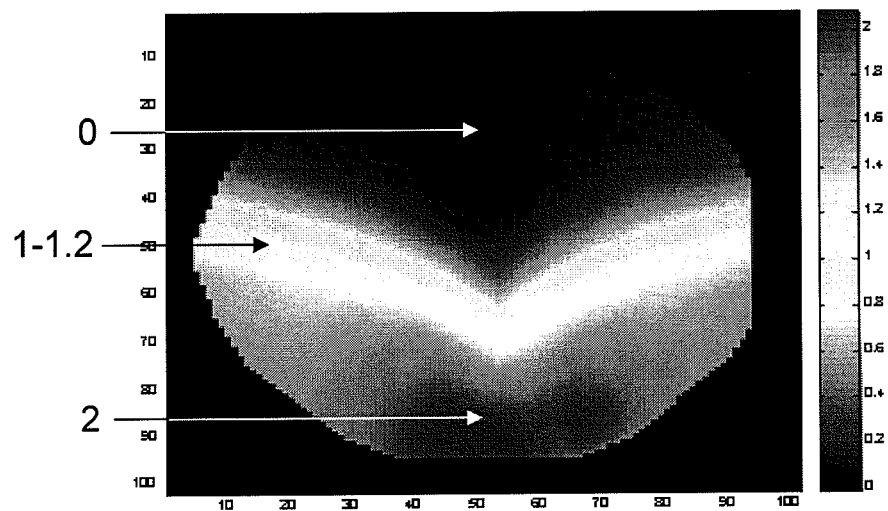

FIGS. 16A-B show the sphere and astigmatic maps for a customized progressive design for plano lens with +2D add power where the design is optimized for wide distance and astigmatic free near region. FIG. 16A is a representation of the cylinder power map with the distance and reading regions possessing 0 unit of power while the off-axis astigmatism adjacent to the power progression possesses −2.2 unit of power while the boundary region between the off-axis astigmatism and the distance region possesses −1 unit of power. FIG. 16B is a representation of the sphere power map with the distance region possesses 0 unit of power, the reading region possesses 2 unit of power and the boundary between the reading and distance region possesses 1-1.2 unit of power. The corridor length for this design can be varied to fit with in the frame with minimum segmental height of 18 to 22 mm. The progression of add power may range from +0.50D to +4.00D. The fitting cross can be located at 0, +2, or +4 mm above the 180 line (located on the geometrical center). The inset is variable from 0-15 degrees of gaze angle which comprises inset ranging from 0 to more than 5 mm.

Example 3

Figure 17A:
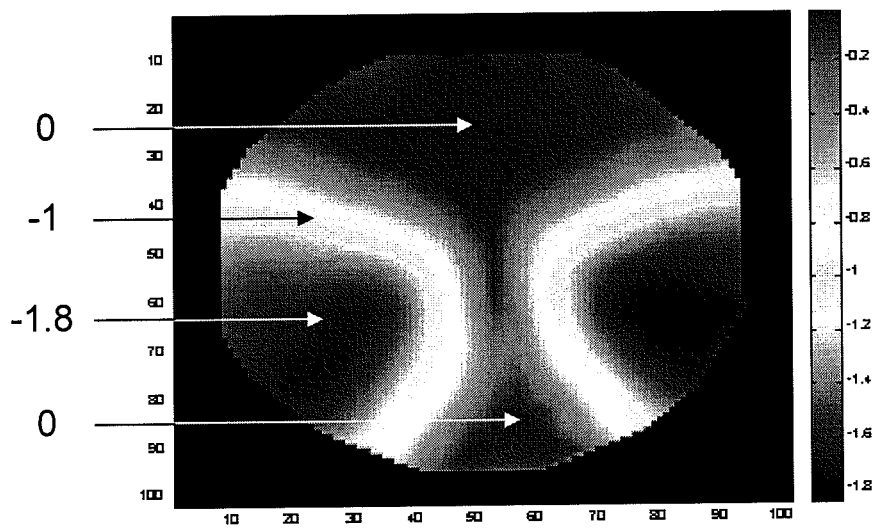
FIGS. 17A-17B show astigmatism and sphere maps of a design optimized for distance and near region free of astigmatism in accordance with various embodiments.
Figure 17B:
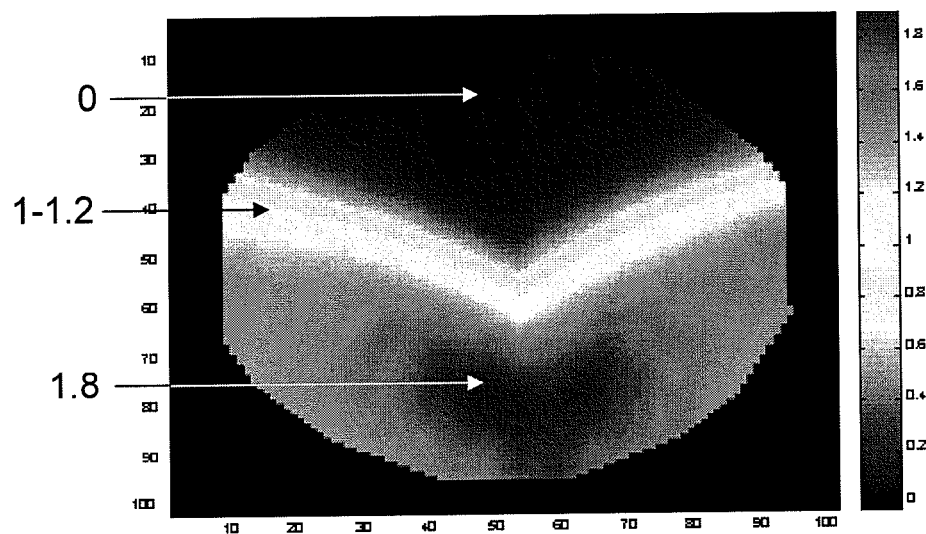

FIGS. 17A-B show the sphere and astigmatic maps for a customized progressive design for plano lens with +2D add power where the design is optimized for substantial distance and near region and the reading region is free of astigmatism. FIG. 17A is a representation of the cylinder power map with the distance and reading regions possessing 0 unit of power while the off-axis astigmatism adjacent to the power progression possesses −1.8 unit of power while the boundary region between the off-axis astigmatism and the distance region possesses −1 unit of power. FIG. 17B is a representation of the sphere power map with the distance region possesses 0 unit of power, the reading region possesses 1.8 unit of power and the boundary between the reading and distance region possesses 1-1.2 unit of power. The corridor length for this design can be varied to fit with in the frame with minimum segmental height of 16 to 22 mm. The progression of add power may range from +0.50D to +4.00D. The fitting cross can be located at 0, +2, or +4 mm above the 180 line (located on the geometrical center). The inset is variable from 0-15 degrees of gaze angle which comprises inset ranging from 0 to more than 5 mm.

Example 4

Figure 18A:
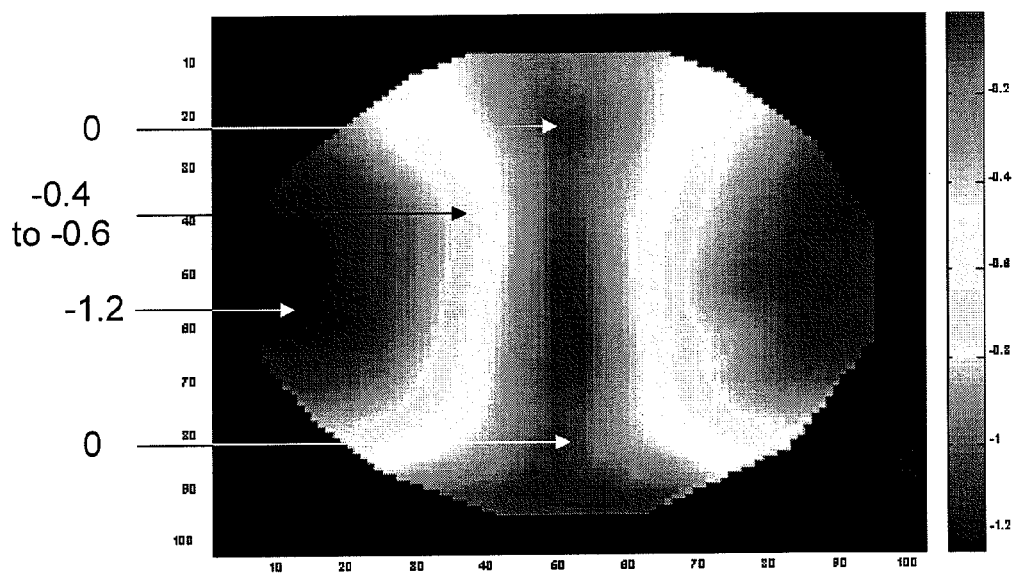
FIGS. 18A-18B show respective astigmatism and sphere maps of a design optimized for computer and reading use in accordance with one embodiment.
Figure 18B:
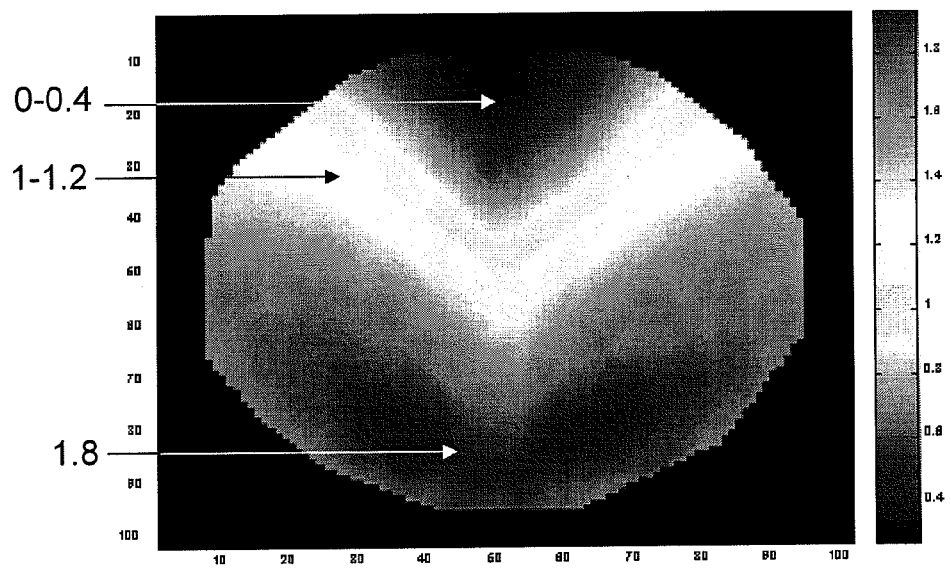

FIGS. 18A-B show the sphere and astigmatic maps for a customized progressive design for plano lens with +2D add power where the design is optimized for computer and reading purpose. FIG. 18A is a representation of the cylinder power map with the central band starting with distance region and ending in reading region possessing 0 unit of power throughout the entire band while the off-axis astigmatism adjacent to the power progression possesses −1.2 unit of power while the boundary region between the off-axis astigmatism and the distance region possesses −0.4 to −0.6 unit of power. FIG. 18B is a representation of the sphere power map with the distance region possesses 0 to 0.4 unit of power, the reading region possesses 1.8 unit of power and the boundary between the reading and distance region possesses 1-1.2 unit of power. The corridor length for this design can be varied to fit with in the frame with minimum segmental height of 16 to 22 mm. The progression of add power may range from +0.50D to +4.00D. The fitting cross can be located at 0, +2, or +4 mm above the 180 line (located on the geometrical center). The inset is variable from 0-15 degrees of gaze angle which comprises inset ranging from 0 to more than 5 mm.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method for designing a progressive addition lens comprising:
   generating a wavefront fitting optimization that takes into account:
   (a) a target sphere contour map,
   (b) a target cylinder map,
   (c) a sphere weighting contour map, and
   (d) a cylinder weighting map,
   wherein an output of the wavefront fitting optimization is a progressive addition surface of a progressive addition lens for a patient; and
   forming the progressive addition lens for the patient taking into account the outputted progressive addition surface.

2. The method of claim 1, wherein generating the wavefront fitting optimization further comprises taking into account:
   (e) a target high order contour map; and
   (f) a high order weighting contour map.

3. The method of claim 1, wherein the progressive addition surface comprises progressive and add powers.

4. The method of claim 3, where generating the wavefront fitting optimization includes taking into account a gaze angle consideration.

5. The method of claim 1, wherein the wavefront fitting optimization limits astigmatism in the progressive addition lens that is comparable to the add power of the particular progressive design, thereby limiting the horizontal and vertical magnification.

6. The method of claim 1, wherein the highest weighting is assigned to the geometrical center of the sphere and cylinder weighting maps.

7. A method for designing a progressive addition lens, comprising:
   calculating a progressive addition lens design based at least in part upon a patient specific refraction and an algorithm that takes into account a wavefront fitting optimization that takes into account:
   (a) a target sphere contour map,
   (b) a target cylinder map,
   (c) a sphere weighting contour map, and
   (d) a cylinder weighting map,
   wherein an output of the wavefront fitting optimization is a progressive addition surface of a lens for a patient; and
   using the calculated progressive addition lens design to form one or more surfaces of the progressive addition lens or multilayered lens assembly of the progressive addition lens.

8. The method of claim 7, wherein the one or more surfaces are selected from the group consisting of (a) a front surface of the lens blank or multilayered lens assembly, (b) a back surface of the lens blank or multilayered lens assembly, (c) front and back surface of the lens blank or multilayered lens assembly, (d) one or more inner surfaces of the multilayered lens assembly, and (e) a changeable refractive index layer in the multilayered lens assembly.

9. The method of claim 8, wherein the changeable refractive index layer is adapted to change its refractive index when exposed to electromagnetic radiation.

10. The method of claim 7, wherein the wavefront fitting optimization limits astigmatism in the lens that is comparable to the add power of the particular progressive design, thereby limiting the horizontal and vertical magnification.

11. The method of claim 7, further comprising customizing the progressive addition lens design based on fitting the design according to spectacle frame dimensions.

12. The method of claim 7, wherein the patient specific refraction comprises a wavefront-based refraction for distance vision, a wavefront-based refraction for near vision, an optometrist-based refraction for distance vision, an optometrist-based refraction for near vision, or a combination thereof.

13. The method of claim 7, wherein the lens blank comprises optical lens blank materials having refraction indices ranging from 1.4 to 1.8.

14. The method of claim 7, wherein using the progressive addition lens design comprises (i) freeform processing a front surface or a back surface of a lens blank or multilayered lens assembly; or (ii) grinding and polishing the front surface or back surface of the lens blank or multilayered lens assembly.

15. The method of claim 7, further comprising optimizing the progressive addition lens design for distance, reading, intermediate, or computer use.

16. The method of claim 7, wherein characteristics of progressive addition surfaces are stored in a computer database comprising multiple progressive addition designs possessing distance and near distances characteristics at different heights and near inset locations based on gaze angle.

17. The method of claim 7, wherein calculating the progressive addition lens design further comprises combining and optimizing a low order surface based on patient specific refraction and a progressive addition surface to generate an output points file that is suitable for freeform processing a single layered lens blank or multilayered lens assembly.

18. The method of claim 1, wherein the (b) target cylinder map is a target cylinder contour map, and the (d) cylinder weighting map is a cylinder weighting contour map.

19. The method of claim 7, wherein the (b) target cylinder map is a target cylinder contour map, and the (d) cylinder weighting map is a cylinder weighting contour map.

20. A method for designing a progressive addition lens comprising:
generating a wavefront fitting optimization that takes into account:
(a) a target sphere map,
(b) a target cylinder contour map,
(c) a sphere weighting map, and
(d) a cylinder weighting contour map,
wherein an output of the wavefront fitting optimization is a progressive addition surface of a progressive addition lens for a patient; and
forming the progressive addition lens for the patient taking into account the outputted progressive addition surface.

21. A method for designing a progressive addition lens, comprising:
calculating a progressive addition lens design based at least in part upon a patient specific refraction and an algorithm that takes into account a wavefront fitting optimization that takes into account:
(a) a target sphere map,
(b) a target cylinder contour map,
(c) a sphere weighting map, and
(d) a cylinder weighting contour map,
wherein an output of the wavefront fitting optimization is a progressive addition surface of a lens for a patient; and
using the calculated progressive addition lens design to form one or more surfaces of the progressive addition lens or multilayered lens assembly of the progressive addition lens.

* * * * *